US010026976B2

(12) United States Patent
Noh et al.

(10) Patent No.: US 10,026,976 B2
(45) Date of Patent: Jul. 17, 2018

(54) HUMIDIFIER FOR FUEL CELL SYSTEM

(71) Applicant: Hyundai Motor Company, Seoul (KR)

(72) Inventors: Yong Gyu Noh, Gyeonggi-Do (KR); Hyun Yoo Kim, Seoul (KR)

(73) Assignee: Hyundai Motor Company, Seoul (KR)

( * ) Notice: Subject to any disclaimer, the term of this patent is extended or adjusted under 35 U.S.C. 154(b) by 672 days.

(21) Appl. No.: 14/567,114

(22) Filed: Dec. 11, 2014

(65) Prior Publication Data

US 2015/0364779 A1   Dec. 17, 2015

(30) Foreign Application Priority Data

Jun. 12, 2014 (KR) .................. 10-2014-0071231

(51) Int. Cl.
*H01M 8/04119* (2016.01)

(52) U.S. Cl.
CPC .... *H01M 8/04149* (2013.01); *H01M 2250/20* (2013.01); *Y02T 90/32* (2013.01)

(58) Field of Classification Search
CPC .......... H01M 8/04149; H01M 2250/20; Y02T 90/32
USPC .................................................. 261/76, 104
See application file for complete search history.

(56) References Cited

U.S. PATENT DOCUMENTS

| | | | |
|---|---|---|---|
| 6,669,177 B2 * | 12/2003 | Shimanuki | B01D 63/02 261/104 |
| 8,415,060 B2 * | 4/2013 | Fukuma | H01M 8/04089 429/408 |
| 2004/0245658 A1 * | 12/2004 | Niland | A61M 16/16 261/104 |
| 2005/0121812 A1 * | 6/2005 | Okada | B01D 53/22 261/104 |
| 2013/0137004 A1 * | 5/2013 | Dehn | H01M 8/04141 429/414 |
| 2014/0162150 A1 * | 6/2014 | Kim | H01M 8/04828 429/413 |
| 2015/0125775 A1 * | 5/2015 | Kuwayama | H01M 8/04164 429/452 |

FOREIGN PATENT DOCUMENTS

| | | |
|---|---|---|
| JP | 2007-123119 A | 5/2007 |
| JP | 2009-238594 A | 10/2009 |
| JP | 2009-299587 A | 12/2009 |
| JP | 2011-140906 A | 7/2011 |
| KR | 10-0667433 B1 | 1/2007 |
| KR | 10-2009-0098317 A | 9/2009 |
| KR | 10-2010-0064138 A | 6/2010 |

\* cited by examiner

*Primary Examiner* — Charles Bushey
(74) *Attorney, Agent, or Firm* — Mintz Levin Cohn Ferris Glovsky and Popeo, P.C.; Peter F. Corless

(57) ABSTRACT

A humidifier for a fuel cell system is provided to improve humidification efficiency of a hollow fiber improving a gas flow inside a membrane module into which tube side air and moist air are introduced. The humidifier includes a membrane module in which hollow fibers are fixed inside a case in a bundle form and a first manifold and a second manifold each assembled at both ends of the case. An inside of the membrane module includes a tube side air supply tube which forms a gas flow in the same direction as the hollow fiber and one side of the tube side air supply tube includes at least one moist air pumping part configured to suction moist air flowing in an exterior of the tube side air supply tube by a flow velocity and a flow pressure of tube side air.

13 Claims, 10 Drawing Sheets

[ SECTION A'-A' ]

HUMIDIFIER FOR FUEL CELL SYSTEM

CROSS-REFERENCE TO RELATED APPLICATION

This application claims under 35 U.S.C. § 119(a) the benefit of Korean Patent Application No. 10-2014-0071231 filed on Jun. 12, 2014, the entire contents of which are incorporated herein by reference.

BACKGROUND (a) Technical Field

The present inventions relates to a humidifier for a fuel cell system using moist air discharged from a cathode of a fuel cell stack. More particularly, the present invention relates to a humidifier for a fuel cell system capable of more efficiently humidifying tube side air supplied to a fuel cell stack to be supplied in a high humidity state.

(b) Background Art

As an example of a fuel cell, a polymer electrolyte membrane fuel cell (PEMFC) which has been mainly researched as a power supply source for driving a vehicle is configured to include a membrane electrode assembly (MEA) in which electrode layers, in which an electrochemical reaction between hydrogen and oxygen is caused, are attached to both sides of an electrolyte membrane to which proton moves, a gas diffusion layer (GDL) serving to uniformly distribute reaction gases and transfer generated electric energy, and a bipolar plate that moves the reaction gases and cooling water.

In the fuel cell, hydrogen (e.g., fuel) and oxygen (e.g., air, an oxidizing agent) are each supplied to an anode and a cathode, which are the electrode layers of the membrane electrode assembly, through a channel of the bipolar plate, in which the hydrogen is supplied to the anode and the oxygen (air) is supplied to the cathode. The hydrogen supplied to the anode is decomposed into proton (H+) and electron (e−) by a catalyst of the electrode layer. Further, only the protons selectively pass through the electrolyte membrane (e.g., a cation exchange membrane) and then are transferred to the cathode, and simultaneously the electrons are transferred to the cathode through the gas diffusion layer and the bipolar plate, which is a conductor.

In the cathode, a reaction to generate water by meeting the proton supplied through the electrolyte membrane and the electron transferred through the bipolar plate with the oxygen in the air supplied to the cathode by an air supply apparatus is caused. In particular, a flow of electrons through an external conducting line is generated due to the movement of the generated proton and a current is generated due to the flow of electrons.

Meanwhile, for an operation of the polymer electrolyte membrane fuel cell, moisture is positively necessary. Accordingly, the air supplied to the fuel cell needs to be humidified by a humidifier. A bubbler type, an injection type, an adsorbent type, and the like are various types of humidifiers that are used. However, since a fuel cell vehicle has a restriction in a package size, a membrane humidifier having a relatively reduced volume has been applied. The membrane humidifier has an advantage in respect to the package size and that special electric power is not required.

FIG. 1 is an exemplary diagram schematically illustrating a state in which air is humidified by a general humidifier (membrane humidifier) for a fuel cell. As illustrated in FIG. 1, external tube side air is forcibly blown by an air blower 1 and passes through the membrane humidifier 10. In particular, supersaturation moist air including water discharged from an outlet of a fuel cell stack 20 passes through the membrane humidifier 10 to provide a moisture exchange between the supersaturation moist air and the tube side air to humidify the tube side air, in which the humidified air is supplied to the fuel cell stack 20.

In particular, water is generated from the cathode of the stack 20 and is discharged in a steam (or droplet) state along with non-reaction air and the membrane humidifier 10 is configured to perform moisture exchange and heat exchange to supply air having substantially high humidity relative to the stack 20. The humidity of the air supplied to the stack 20 is a sensitive operation variable which determines an output and durability of the fuel cell. As illustrated in FIG. 1, to improve an operation characteristic, a bypass line 2 configured to bypass the membrane humidifier 10 and a valve 3 are applied based on operation conditions.

A general membrane humidifier which is a gas to gas membrane humidifier using hollow fibers may implement high integration of the hollow fibers having a wide contact surface area to sufficiently humidify the fuel cell stack within a minimal capacity and recovers and reuses moisture and heat included in the gas which is discharged at an increased temperature from the fuel cell stack through the membrane humidifier, thereby separately saving moisture and energy required for the humidification of the fuel cell stack.

A moisture content may be maintained by supplying moisture of a predetermined amount or greater to an ionomer within the electrolyte membrane and a catalyst layer of the membrane electrode assembly which are core components of the fuel cell, to improve performance of ion conductivity which is performed by the electrolyte membrane and the ionomer. Herein, the membrane humidifier is configured to supply the moisture and the heat included in the gas discharged at the increased temperature from the fuel cell stack to dry reacting gas at a normal temperature (e.g., a temperature that is not increased) supplied to the fuel cell stack through a surface of the membrane to humidify the fuel cell stack and maintain a temperature of the fuel cell stack.

Hereinafter, a structure of the general membrane humidifier will be described in detail. In the accompanying drawings, FIG. 2 is an exemplary transversal cross-sectional view schematically illustrating a general membrane humidifier and FIG. 3 is an exemplary cross-sectional view taken along A-A of FIG. 2. As illustrated in FIGS. 2 and 3, the general membrane humidifier 10 includes a manifold including air inlets 11 and 12 and air outlets 13 and 14 and hollow fibers 16 fixed inside the manifold 15, in which the hollow fibers 16 may be attached and fixed to the manifold 16 by plastic such as polyurethane.

In particular, the hollow fiber 16 is provided in plural and is densely embedded in a bundle form. Both ends of a bundle 17 of hollow fibers are fixedly bonded to a potting part 18 disposed inside the manifold 15 and thus the bundle 17 of hollow fibers is fixed inside the manifold 15. The membrane humidifier 10 is configured to perform heat and water exchange between tube side air and over-humidification air in the hollow fibers 16. In particular, uniformity of a gas flow increases humidification efficiency of the humidifier. However, the tube side air has a substantially high uniform flow characteristic, but uniformity of a flow may not be maintained in a shell side space of a section of the humidifier in which the over-humidification air supplying moisture flows since an empty space is formed in an outer region of the manifold due to a lack of the hollow fiber.

In other words, the high-temperature moist air (e.g., over-humidification air) flows along a path having the least resistance and a substantially central portion of the humidifier 10 is densely provided with the hollow fibers 16, and thus it may be difficult for the over-humidification air containing a substantial amount of moisture to reach the substantially central portion of the humidifier 10 and most of the over-humidification air flows in a space of the shell side of the section of the humidifier. Therefore, the hollow fiber disposed in the space of the shell side of the humidifier 10 has low contribution to humidification and the over-humidification air flowing in an exterior of the humidifier 10 has the reduced temperature due to a heat transfer to the exterior and is condensed into water, such that a humidification effect may be further reduced.

To improve the problem of the existing membrane humidifier, a membrane humidifier for a fuel cell system to which a channel opening and closing valve is applied has been developed. In the accompanying drawings, FIG. 4 is an exemplary configuration diagram schematically illustrating the existing membrane humidifier for a fuel cell system to which the channel opening and closing valve is applied and FIG. 5 is an exemplary diagram schematically illustrating an operating state depending on an output section of the membrane humidifier for a fuel cell system.

As illustrated in FIG. 4, the existing membrane humidifier 10 for a fuel cell includes a channel opening and closing valve 19 at a back end of the bundle 17 of hollow fibers adjacent to the humidification air outlet 14 through which the humidification air supplied to the fuel cell stack is discharged. In particular, the channel opening and closing valve 19 is integrally disposed at a distal end of a tube side air supply tube 21 which partitions an exterior and a substantially central portion of the bundle of hollow fibers and both ends of the tube side air supply tube 21 are fixedly supported by the potting part 18 inside the manifold 15. In other words, the channel opening and closing valve 19 is fixedly mounted on the potting part 18 within the manifold 15.

As described above, For the general membrane humidifier, since the tube side air mainly flows in the central portion of the bundle of hollow fibers and the moist air (or over-humidification air) mainly flows in the exterior of the bundle of hollow fibers, and as illustrated in FIG. 4, the channel opening and closing valve 19 is applied to the central portion of the bundle 17 of hollow fibers inside the membrane humidifier 10 to solve a distribution problem of the tube side air and the moist air. In particular, as the channel opening and closing valve 19, a valve which is operated to be opened at a predetermined pressure or greater is used.

Therefore, the valve is closed in a low flow rate condition (e.g., low output condition) to cause the tube side air supplied from the air blower 1 to flow in the outer region of the bundle 17 of hollow fibers, to mainly humidify the exterior of the membrane humidifier 10 and as a flow rate (output) is increased, a pressure is increased and thus the valve 19 is slowly opened to cause the tube side air to flow throughout the bundle 17 of hollow fibers, to humidify the whole portion of the membrane humidifier. Consequently, the channel opening and closing valve 19 is applied to increase humidification performance (e.g., efficiency) of the membrane humidifier.

However, in the existing membrane humidifier 10 adopting the channel opening and closing valve 19, it may be difficult to mount the valve on the potting part 18 to which the bundle 17 of hollow fibers is fixed, a structure of the membrane humidifier 10 is complex, and it may be difficult to determine or control a design for the valve opening and closing.

The above information disclosed in this section is merely for enhancement of understanding of the background of the invention and therefore it may contain information that does not form the prior art that is already known in this country to a person of ordinary skill in the art.

SUMMARY

The present invention provides a humidifier for a fuel cell system that may improve humidification efficiency of a hollow fiber and power generation efficiency and durability of a fuel cell stack by improving a gas flow inside a membrane module into which tube side air and moist air are introduced.

In one aspect, the present invention provides a humidifier for a fuel cell system, that may include: a membrane module in which hollow fibers may be fixed within a case in a bundle form; and a first manifold and a second manifold each assembled at both ends of the case, wherein an inside of the membrane module may include a tube side air supply tube configured to form a gas flow in the same direction as the hollow fiber and one side (e.g., a first side) of the tube side air supply tube includes at least one moist air pumping part configured to suction moist air flowing to an exterior of the tube side air supply tube by a flow velocity and a flow pressure of tube side air, to increase humidification performance of humidification air discharged to a fuel cell stack.

As the moist air pumping part suctions the moist air flowing from the exterior of the tube side air supply tube, the moist air pumping part may lead to a flow of moist air in a radial direction within the membrane module and lead to a mixing of the tube side air flowing in the tube side air supply tube with the suctioned moist air. The moist air pumping part may be configured by adopting a single ejector structure or configured by adopting a multi-stage ejector structure configured by serially connecting a plurality of ejectors in a multi stage.

The moist air pumping part may include a venturi tube structure, for example, the moist air pumping part may include a venturi tube structure and may have a minimal diameter (e.g., of a first diameter) part disposed at a substantial center thereof and greater diameter parts (e.g., of a second diameter, the second diameter greater than the first diameter) integrally formed at left and right sides of the minimal diameter part and form the gas flow in the same direction as the tube side air supply tube, in which a surface of the minimal diameter part may include a plurality of introduction apertures for introducing the moist air.

The moist air pumping part may be mounted at a back end of the tube side air supply tube to be closely disposed to (e.g., to be adjacent to) a moist air inlet mounted in the first manifold. The tube side air supply tube may be disposed at a substantial center based on a diameter of the membrane module or eccentrically disposed to one side based on a diameter of the membrane module or may be configured in plural to be disposed to be spaced apart from each other inside the membrane module. The tube side air supply tube may be eccentrically disposed to one side based on a diameter of the membrane module and may be closely disposed to a moist air inlet.

The membrane module may include a tube support attached to an inner diameter of the case to support the tube side air supply tube. In the membrane module, a first manifold may be coupled with one end (e.g., a first end) of the case via a manifold and sizes of a plurality of apertures formed along a circumferential direction of the manifold may be differently formed based on a positional relationship between the moist air pumping part and a moist air inlet mounted in a first manifold.

In the membrane module, a first manifold may be coupled with one end of the case via a manifold and an aperture closest to the moist air pumping part and the moist air inlet mounted in the first manifold among a plurality of apertures formed along a circumferential direction of the manifold may be formed to be greater than the other apertures. The inside of the membrane module may include a first tube side air supply tube including a first moist air pumping part and a second tube side air supply pipe including a second moist air pumping part and a check valve may be mounted in the first tube side air supply pipe in which the first moist air pumping part having improved performance among the first and second moist air pumping parts may be mounted to automatically control an operation of the first moist air pumping part.

According to the exemplary embodiments of the present invention, the humidifier for a fuel cell system may improve the gas flow inside the membrane module in which the hollow fibers may be fixed in the bundle form to increase the humidification efficiency of the hollow fibers and the humidity of the tube side air, thereby increasing power generation efficiency and durability of the fuel cell stack.

BRIEF DESCRIPTION OF THE DRAWINGS

The above and other features of the present invention will now be described in detail with reference to exemplary embodiments thereof illustrated in the accompanying drawings which are given hereinbelow by way of illustration only, and thus are not limitative of the present invention, and wherein.

Figure 1:
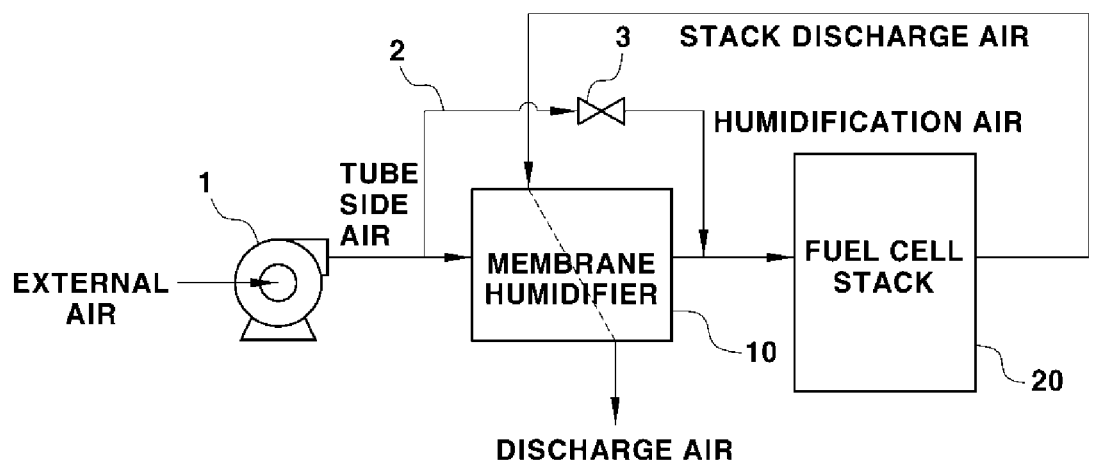
FIG. 1 is an exemplary diagram schematically illustrating a state in which air supplied to a fuel cell stack is humidified by using a general humidifier for a fuel cell system according to the related art.
Figure 2:
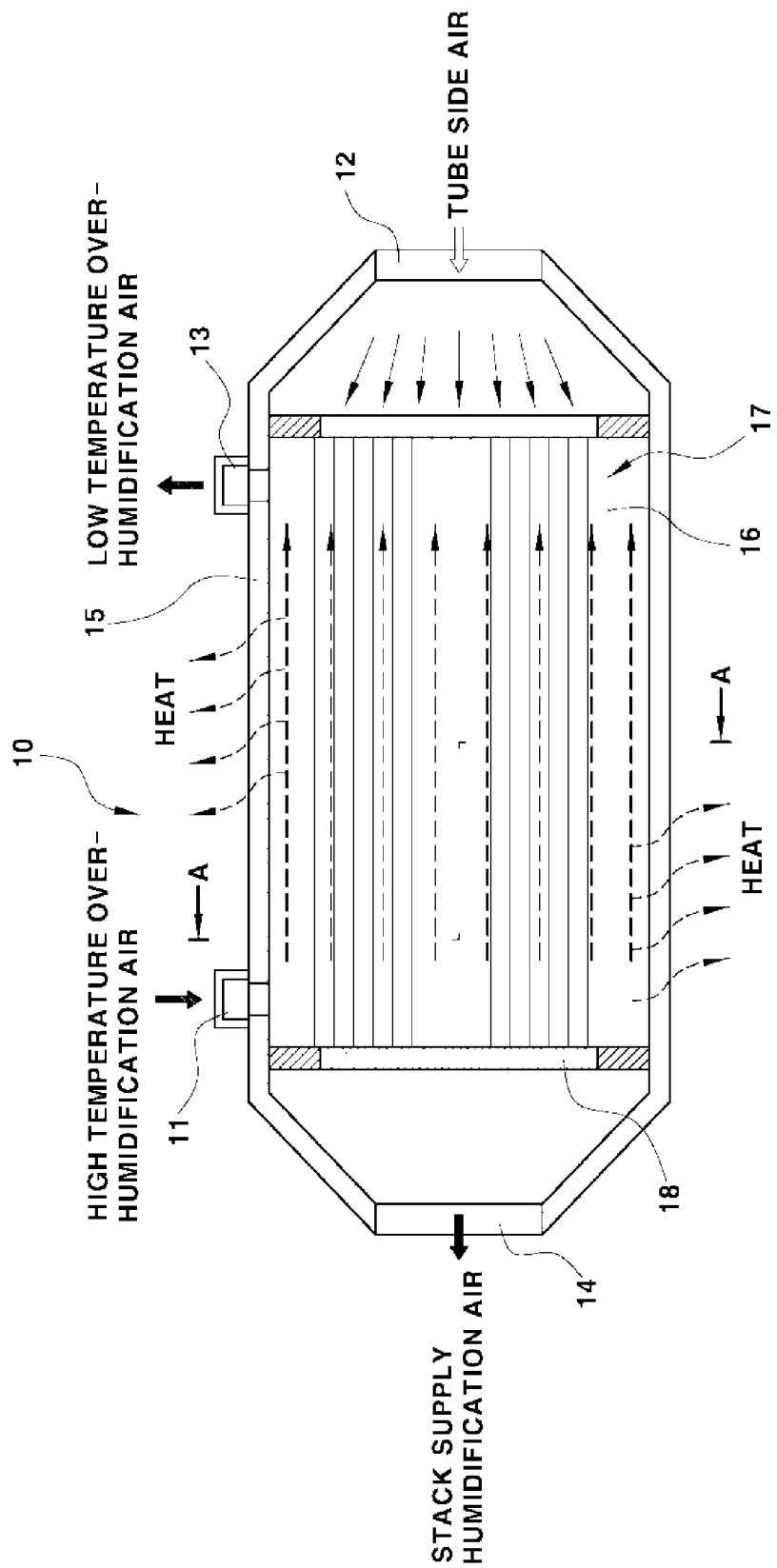
FIG. 2 is an exemplary transversal cross-sectional view schematically illustrating a general membrane humidifier according to the related art.
Figure 3:
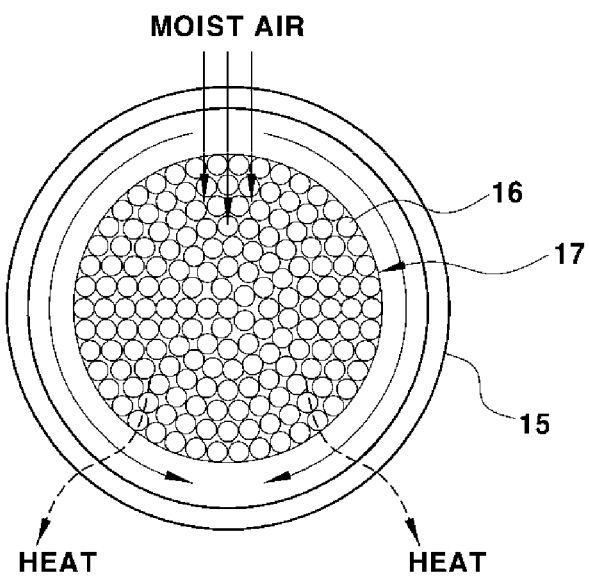
FIG. 3 is an exemplary cross-sectional view taken along A-A of FIG. 2 according to the related art.
Figure 4:
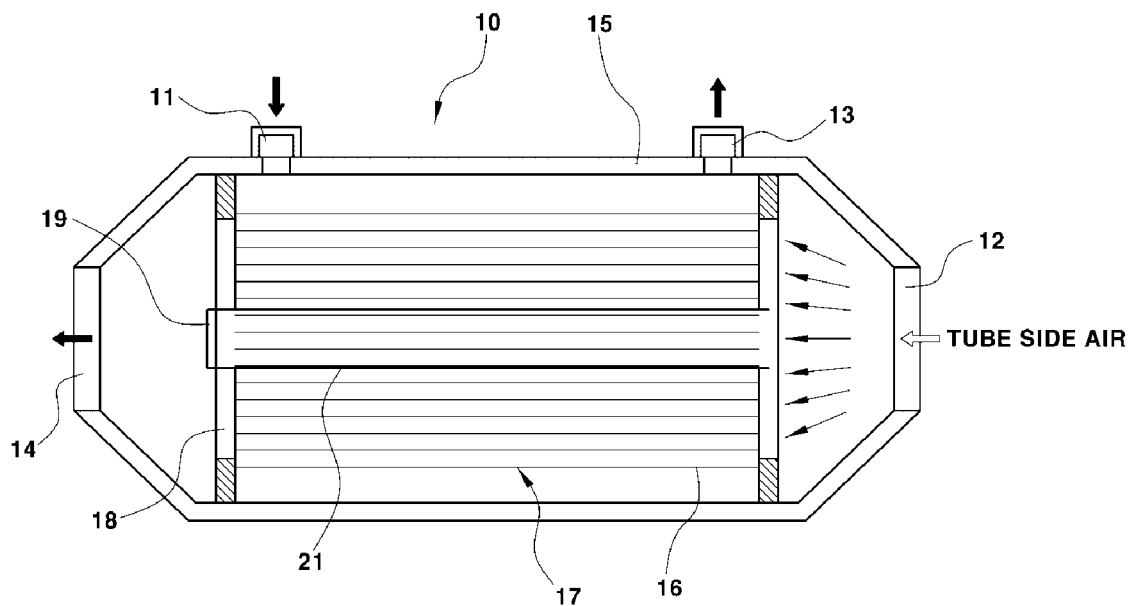
FIG. 4 is an exemplary configuration diagram schematically illustrating a membrane humidifier for a fuel cell system according to the related art to which a channel opening and closing valve is applied.
Figure 5:
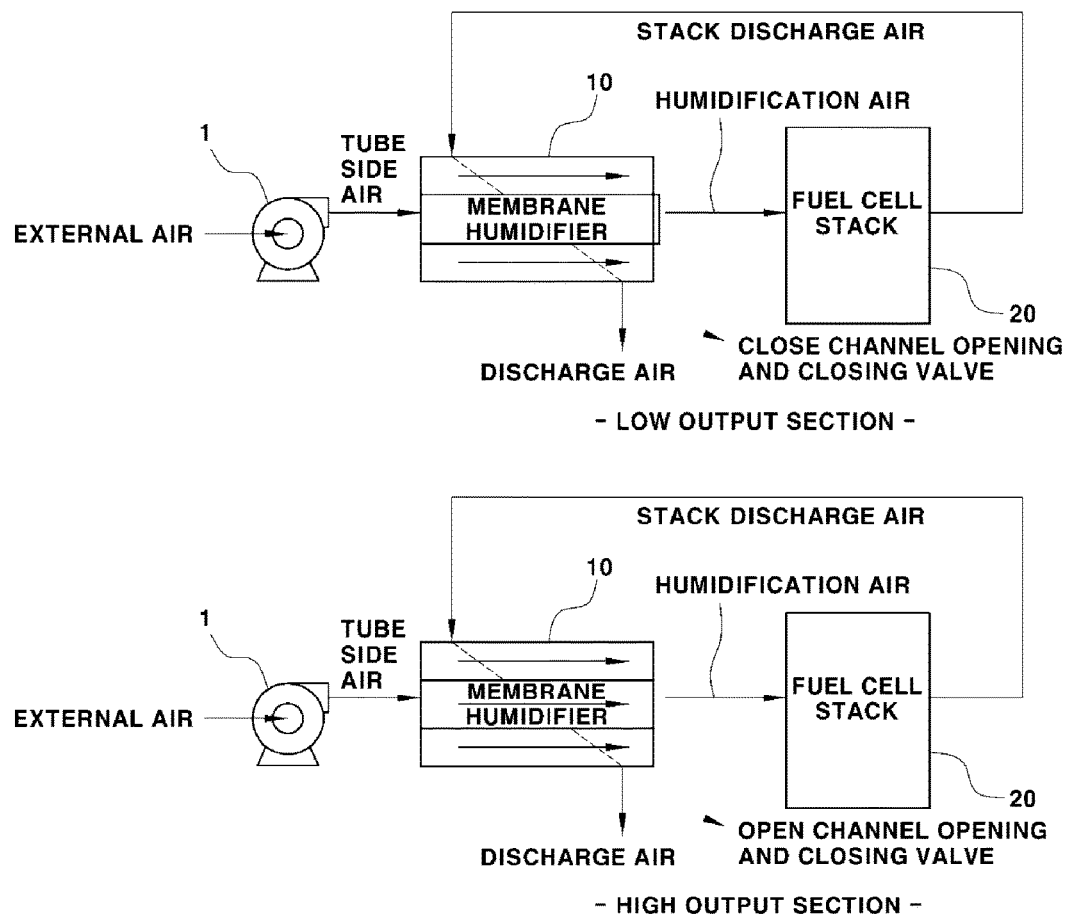
FIG. 5 is an exemplary diagram schematically illustrating an operation flow depending on an output section of the membrane humidifier for a fuel cell system according to the related art.

It should be understood that the appended drawings are not necessarily to scale, presenting a somewhat simplified representation of various exemplary features illustrative of the basic principles of the invention. The specific design features of the present invention as disclosed herein, including, for example, specific dimensions, orientations, locations, and shapes will be determined in part by the particular intended application and use environment. In the figures, reference numbers refer to the same or equivalent parts of the present invention throughout the several figures of the drawing.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Hereinafter reference will now be made in detail to various exemplary embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

Hereinafter, exemplary embodiments of the present invention are described so as to be easily practiced by a person skilled in the art to which the present invention pertains in detail with reference to the accompanying drawings.

Figure 6:
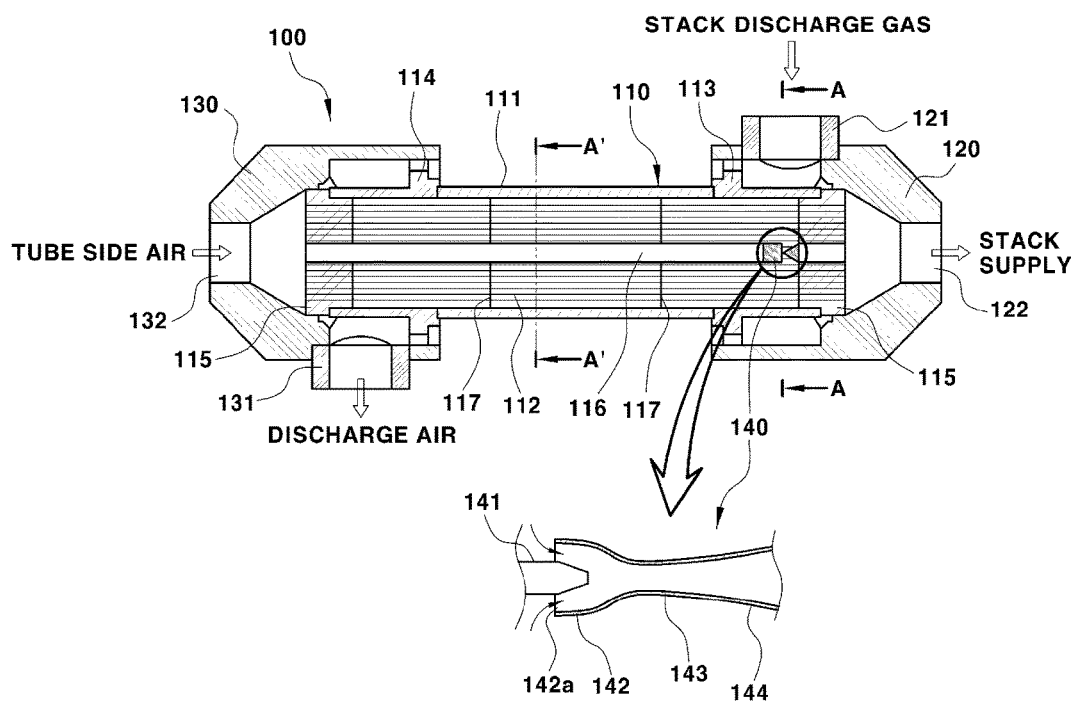
FIG. 6 is an exemplary diagram schematically illustrating a humidifier for a fuel cell system according to an exemplary embodiment of the present invention.

A humidifier for a fuel cell system according to an exemplary embodiment of the present invention may include a membrane humidifier 100 configured to humidify tube side air by a method for transferring moisture through hollow fibers and supply the humidified tube side air to a fuel cell stack. As illustrated in FIG. 6, the membrane humidifier 100 may include a membrane module 110 in which hollow fibers 112 may be fixed inside a case 111 and a first manifold 120 and a second manifold 130 each assembled at both ends of the case 111 of the membrane module 110.

In particular, the first and second manifolds 120 and 130 may be coupled with the case 111 via manifolds 113 and 114 each bonded to both ends of the case 111. The first manifold 120 may include a moist air inlet 121 and a humidification air outlet 122, the second manifold 130 may include a moist air outlet 131 and a tube side air inlet 132, an inside of the case 111 of the membrane module 110 may include the hollow fibers 112 in a bundle form, both ends of the bundle of hollow fibers 112 may be fixed to both ends of the case 111 by potting parts 115 to fix a position of the bundle of hollow fibers 112 within the case 111. The potting parts 115 may each be disposed at both ends of the case 111 and thus may each be disposed within the first and second manifolds 120 and 130.

In this configuration, the bundle of hollow fibers 112 may be formed in a form in which a hollow fiber of a substantially central portion based on an outer diameter of a cross section of the humidifier may be removed and the bundle of hollow fibers 112 may be formed by bonding and fixing the hollow fibers to an exterior of a tube side air supply tube 116 to be described below. The tube side air supply tube 116 may have a structure through which the tube side air may flow in the same direction as the hollow fibers 112, and for example, may extend in a gas flow direction of the hollow fibers 115 and an axial direction of the membrane module 110, and may be mounted inside the membrane module 110 to provide a gas flow in the same direction as the hollow fiber 112.

To form a high speed jet flow (e.g., tube side air jet flow) of the tube side air inside the membrane module 110, a moist air pumping part 140 having a known ejector structure or a known venturi tube structure may be mounted inside the membrane module 110. Generally, a substantially central portion of the bundle of hollow fibers in which the tube side air mainly flows has a greater gas flow velocity than an outer portion of the bundle of hollow fibers in which the moist air mainly flows, but the moist air pumping part 140 may be mounted inside the membrane module 110 to form the tube side air jet flow at a greater speed than the existing flow velocity of the tube side air inside the membrane module (in detail, tube side air supply tube) by an aeromechanical theory based on a principle of the ejector or a principle of the venturi tube (Bernoulli's principle).

The moist air pumping part 140 may be mounted at one side in a length direction of the tube side air supply tube 116 to suction the moist air flowing outside the tube side air supply tube 116 and mix the moist air with the tube side air flowing inside the tube side air supply tube 116 and as illustrated in FIG. 6, may be configured by applying the known ejector structure. The moist air pumping part 140 may be configured to suction the moist air, which flows from one side of the tube side air supply tube 116 in which the tube side air supplied to the membrane module 110 flows toward the outside of the tube side air supply tube 116, into the tube side air supply tube 116 to increase humidity of the tube side air, thereby increasing a humidification rate of the humidification air discharged to the fuel cell stack.

The moist air pumping part 140 may include the known ejector structure and for example, as illustrated in FIG. 6, may include a nozzle part 141, a suction part 142, a mixing part 143, and a diffuser 144. The nozzle part 141 may be communicateably bonded to one side of the tube side air supply tube 116 to be integrally connected to one side thereof and thus may be supplied with the tube side air flowing at a substantially high speed and a substantially high pressure through the tube side air supply tube 116.

The suction part 142 may be generally formed to have a greater diameter than a maximum diameter of the nozzle part 141 and may be bonded and connected to the nozzle part 141 in a form in which the suction part 142 surrounds an outer circumferential surface of a back end of the nozzle part 141 and one side thereof may include an opening 142a through which the moist air may be introduced. The suction part 142 may be supplied with the tube side air discharged from the nozzle part 141. In particular, the moist air may be suctioned through the opening 142a by the high pressure of the tube side air discharged from the nozzle part 141 and may be introduced into the suction part 142.

The mixing part 143 may be integrally formed between a distal end of the suction part 142 and a leading end of the diffuser 144 and may be formed to have a smaller diameter than that of the suction part 142 to increase a gas pressure, thereby leading to the mixing of the introduced tube side air and moist air. Therefore, the gas of the suction part 142 may move at a substantially high speed by discharging the tube side air at a substantially high pressure from the nozzle part 141 and thus may be discharged to the mixing part 143, and simultaneously, the moist air outside the tube side air supply tube 116 may be suctioned into the suction part 142 through the opening 142a and then may be introduced into the mixing part 143. In particular, the tube side air and the moist air which move to the mixing part 143 may be mixed in the mixing part 143, which in turn move to the diffuser 144. The diffuser 144 may be formed to have a diameter which gradually increases in a length direction and may be integrally formed at a distal end of the mixing part 143 and may lead to a diffusion of the humidification air formed in the mixing part 143 (e.g., tube side air mixed with the moist air in the mixing part) to form a pressure suitable to be supplied to the fuel cell stack.

Figure 7:
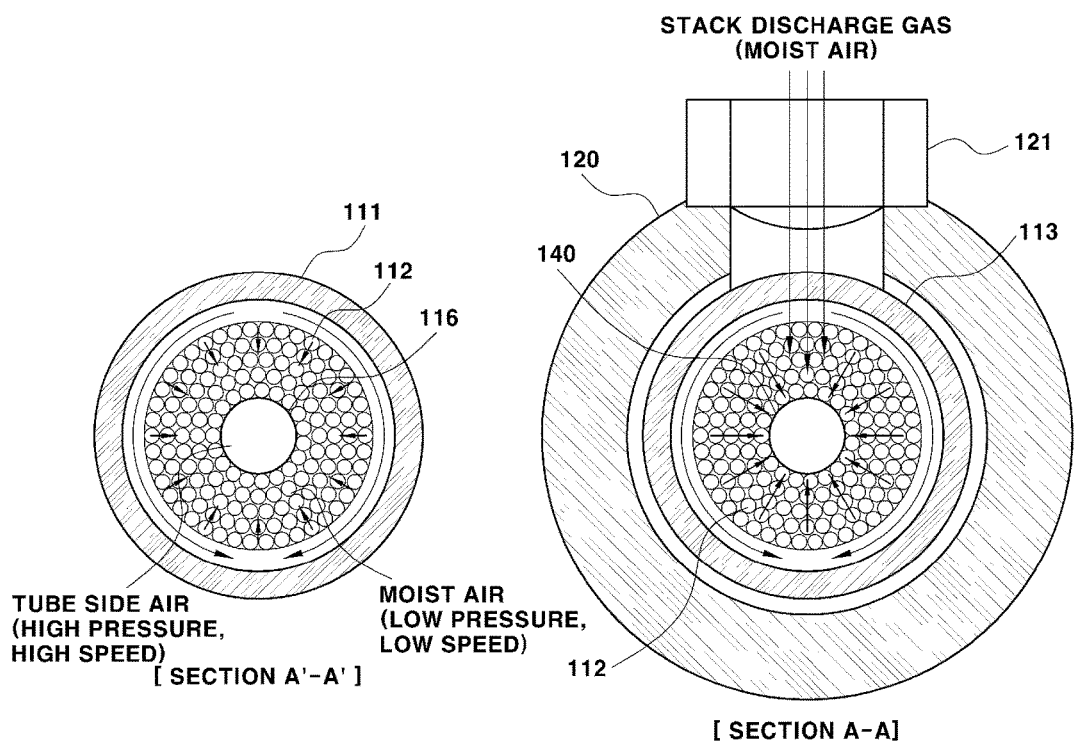
FIG. 7 is an exemplary cross-sectional view taken along A-A and A'-A' of FIG. 6 according to an exemplary embodiment of the present invention.

Referring to FIG. 7, as a flow velocity of the tube side air flowing at a high speed and a high pressure inside the tube side air supply tube 116 may be increased by the moist air pumping part 140 to form a high speed jet flow, the moist air which may be introduced into the membrane module 110 through the moist air inlet 121 to flow in the exterior of the tube side air supply tube 116 at a substantially low speed and a substantially low pressure may be introduced into the tube side air supply tube 116 side to be directly mixed with the tube side air, thereby improving the humidity of the humidification air.

The moist air may be introduced into the tube side air supply tube 116 side to improve a movement of the moist air in a radial direction, thereby increasing uniformity of the gas flow and improving humidification efficiency of the hollow fibers 112. In particular, the moist air (e.g., gas discharged from a cathode of the stack) may be suctioned into the tube side air supply tube 116 in which the tube side air mainly flows to cause the flow of the moist air to be more uniform in the bundle of hollow fibers 112 disposed outside the tube side air supply tube 116 simultaneously with increasing the humidification efficiency of the tube side air flowing in the tube side air supply tube 116, thereby increasing the humidification efficiency of the tube side air by moisture exchange of the hollow fibers 112. Additionally, a size (e.g., diameter) of the tube side air supply tube 116 may be determined based on a packing ratio of the humidifier, a required recycling amount of moist air, humidifier efficiency, and stack supply humidity.

The tube side air supply tube 116 may be supported by a tube support 117 attached to an inner diameter of the case 111 and both ends thereof each may be fixedly supported by being attached to or inserted into the potting parts 115 of the membrane module 110. An exterior of the tube side air supply tube 116 may be fixedly bonded to the hollow fiber 112 and thus the tube side air supply tube 116 may be supported even by the hollow fiber 112 supported by the potting part 115.

The tube support 117 may be attached to the inner diameter of the case 111 to support the tube side air supply tube 116, to suppress a vibration of the hollow fiber 112 during the gas flow at a substantially high output and a substantially high flow rate and to prevent the hollow fibers from tangling during manufacturing of the humidifier. The flow velocity greater than at an outer portion of the bundle of hollow fibers 112 may be formed in the tube side air supply tube 116 and as described above, a high speed tube side air jet flow may be formed by the moist air pumping part 140.

As described above, the membrane humidifier 100 that may include the moist air pumping part 140 may be configured to pump gas (e.g., moist air) containing increased moisture and oxygen discharged from the stack from the exterior of the bundle of hollow fibers 112 and supply the pumped gas to the stack, thereby recycling the moist air. In particular, the moist air discharged from the cathode of the stack may contain increased humidity and non-reaction oxygen to effectively recycle air, thereby improving performance and durability of the stack. The membrane humidifier 110 of the air recycling type may be configured to directly supply moisture to the fuel cell stack and reuse the non-reaction oxygen, thereby reducing a required air amount of an air compressor providing the tube side air and the use of the expensive hollow fiber may be reduced, thereby saving costs.

Meanwhile, in the membrane humidifier structure as described above, the moist air pumping part 140 may be disposed closest to (e.g., adjacent to) the moist air inlet 121 into which the moist air may be introduced from the fuel cell stack. In particular, the moist air pumping part 140 may be disposed closer to the moist air inlet 121 than at a centered point in the length direction of the tube side air supply tube 116.

Referring to FIG. 6, the moist air pumping part 140 may be mounted at the back end of the tube side air supply tube 116 to be closely disposed to, that is, adjacent to, the moist air inlet 121, and in particular, may be disposed at a lower portion of the moist air inlet 121 based on a radial direction. Accordingly, the moist air pumping part 140 may be closely disposed to the moist air inlet 121 side to guide the gas flow of a shell side of the membrane module 10 as illustrated in section A-A of FIG. 7 to the central portion of the membrane module 110, thereby increasing the humidification efficiency of the hollow fiber 112.

The performance and effect of the above-mentioned membrane humidifier 100 may be affected by a suctioned flow rate of the moist air pumped by the high speed jet flow of the tube side air and may be affected by a mass flow rate of the tube side air and an entrainment ratio of the suctioned moist air important variables in an aeromechanical viewpoint, and variables such as a structure of the humidifier, aerodynamic performance and efficiency due to a geometric shape of the ejector, and humidification temperature and pressure.

A general single type ejector may be configured to generate a high vacuum pressure, while a multi-stage ejector may be configured to pump a substantially low vacuum pressure and a substantial flow rate. In other words, the multi-stage ejector may have an increased entrainment ratio of the suctioned gas. Therefore, as the moist air pumping part 140, the multi-stage ejector configured by serially connecting the plurality of ejectors in a multi stage may be used and thus the moist air may be more efficiently pumped in a limited space.

Figure 8:
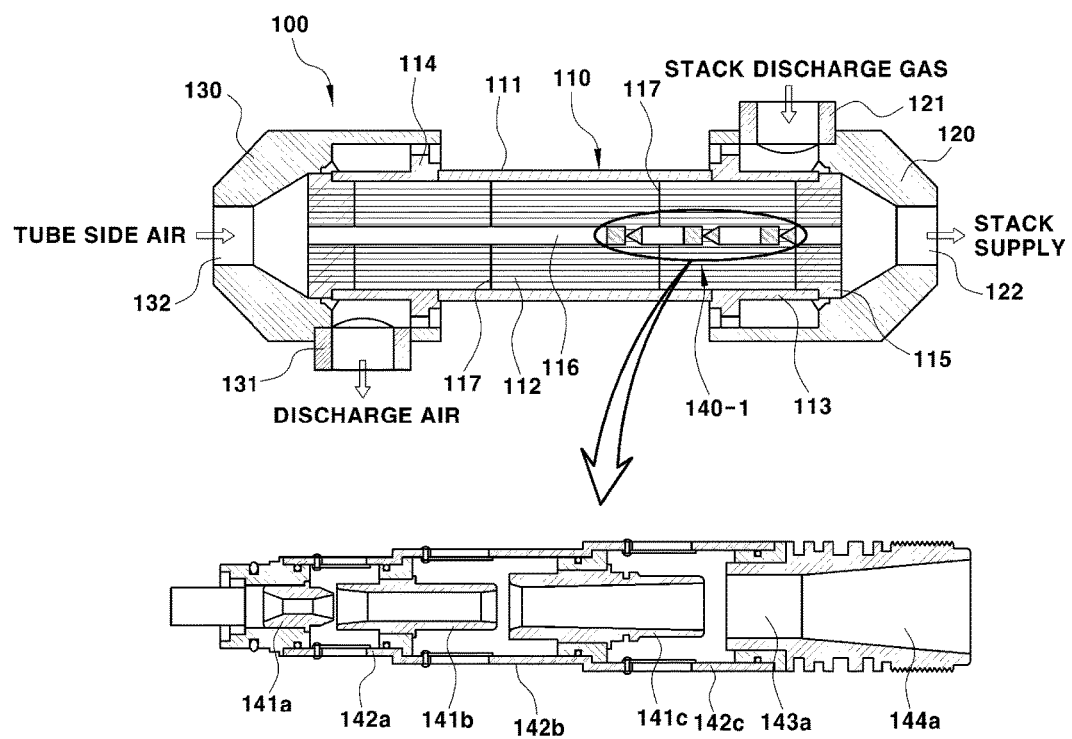
FIG. 8 is an exemplary diagram schematically illustrating a membrane humidifier adopting a multi-stage ejector structure, as the exemplary embodiment of the present invention.

For example, as a moist air pumping part 140-1, a two-stage ejector, a three-stage ejector, or the like may be used and a multi-stage serial ejector configured by serially connecting the plurality of ejectors in a multi stage is a known technology, and therefore a detailed description thereof will be omitted. However, referring to an enlarged view of FIG. 8, for the moist air pumping part 140-1 configured as the multi-stage ejector, a mixing part 143a and a diffuser 144a may be included in a third ejector disposed and in addition, a first ejector and a second ejector may include nozzle parts 141a, 141b, and 141c and suction parts 142a, 142b, and 142c.

Figure 9:
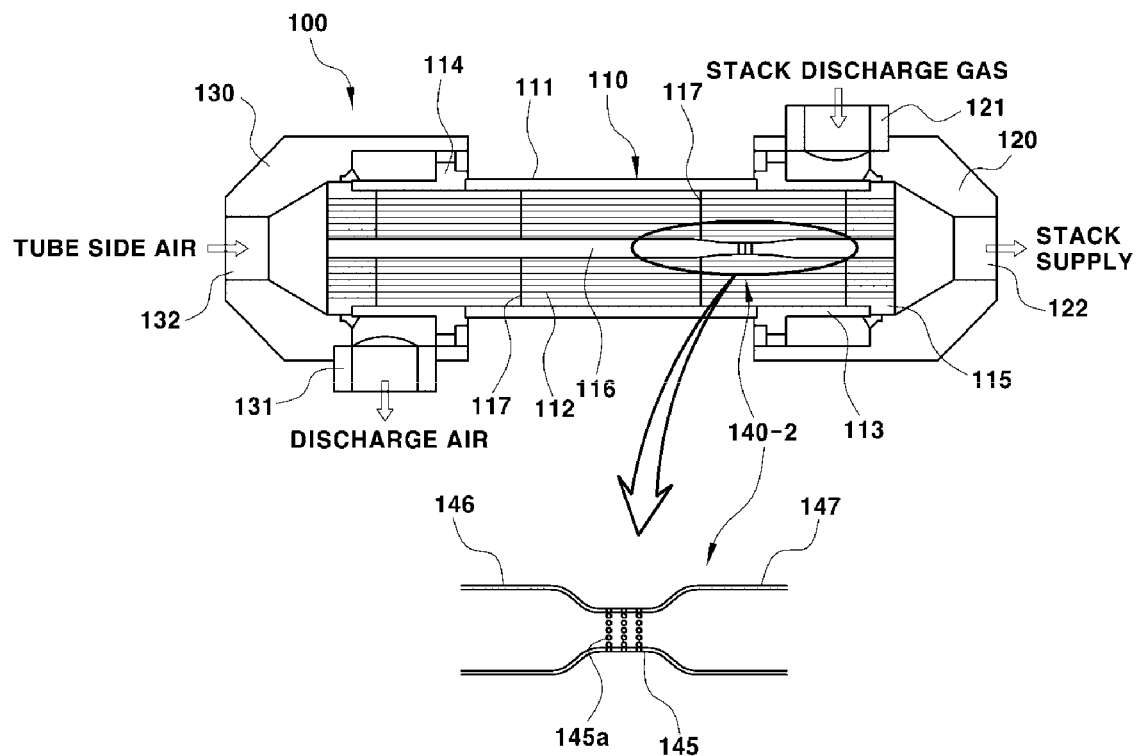
FIG. 9 is an exemplary diagram schematically illustrating a membrane humidifier adopting a venturi tube structure, as the exemplary embodiment of the present invention.
Figure 10:
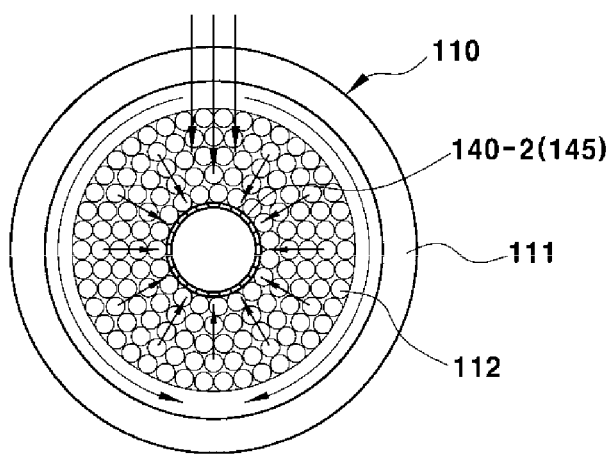
FIG. 10 is an exemplary schematic cross-sectional view taken along line B-B of FIG. 9 according to an exemplary embodiment of the present invention.

In the accompanying drawings, FIG. 9 is an exemplary diagram schematically illustrating a membrane humidifier including a venturi tube structure and FIG. 10 is an exemplary schematic cross-sectional view taken along line B-B of FIG. 9. Referring to FIG. 9, to form the high speed jet flow of the tube side air, the membrane humidifier 100 according to the exemplary embodiment of the present invention may include the moist air pumping part to which a principle (Bernoulli's principle) of a venturi tube may be applied. In particular, a moist air pumping part 140-2 may be integrally formed with the tube side air supply tube 116 and as illustrated in FIG. 9, a diameter of a portion that corresponds to a position at which the moist air is suctioned, that is, a diameter (e.g., channel cross sectional area) of a neck to which the venturi tube principle is applied is important.

Therefore, as illustrated in FIGS. 9 and 10, the moist air pumping part 140-2 may be configured to have a minimal diameter part 145 disposed at a substantial center thereof and maximum diameter parts 146 and 147 (e.g., a diameter part 145 having a first diameter greater than a second diameter of a maximum diameter part 167 or 147) which may be integrally formed at left and right sides of the minimal diameter part 145 and form the gas flow in the same direction as the tube side air supply tube 116. In particular, a surface of the minimal diameter part 145 may include a plurality of introduction apertures 145a to introduce the moist air flowing in the outside (e.g., bundle of hollow fibers 112) and the maximum diameter parts 146 and 147 may be formed to be integrally connected to the tube side air supply tube 116.

Particularly, the introduction aperture 145a may be formed in a circular aperture shape or a longitudinal slit shape. The moist air pumping part 140-2 may be configured to increase the flow velocity of the tube side air by the venturi tube structure to generate the high speed jet flow to reduce the inner pressure be less than the outer pressure of the bundle of hollow fibers 112, thereby suctioning the moist air into the moist air pumping part 140-2. In particular, as important design variables which control the moist air suction performance, there are an inner diameter of the tube side air supply tube 116, an inner diameter of the minimal diameter part 145 of the moist air pumping part 140-2, a length of the moist air pumping part 140-2, a position of the minimal diameter part 145, temperature and pressure of operating air (tube side air and moist air), and the like.

Figure 11:
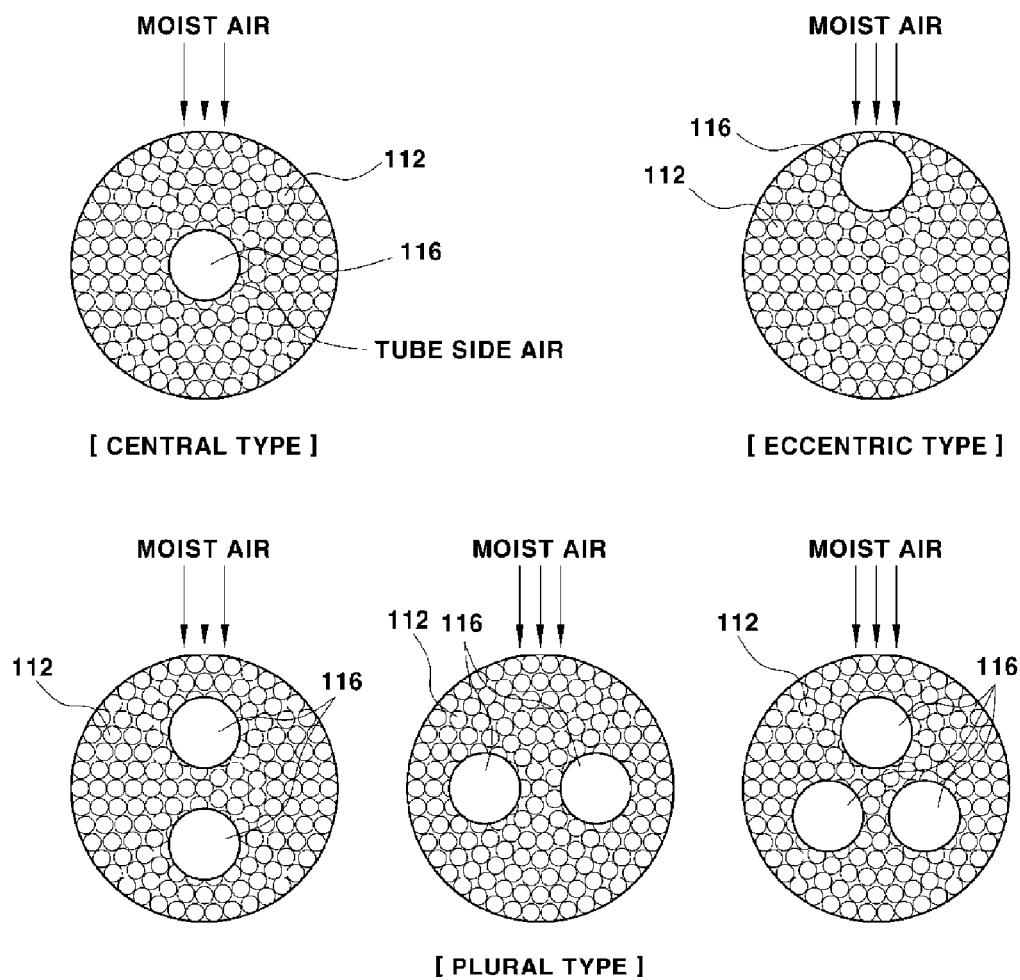
FIG. 11 is an exemplary diagram schematically illustrating a state in which positions and the number of tube side air supply tubes are variously changed, as an exemplary embodiment of the present invention.
Figure 12:
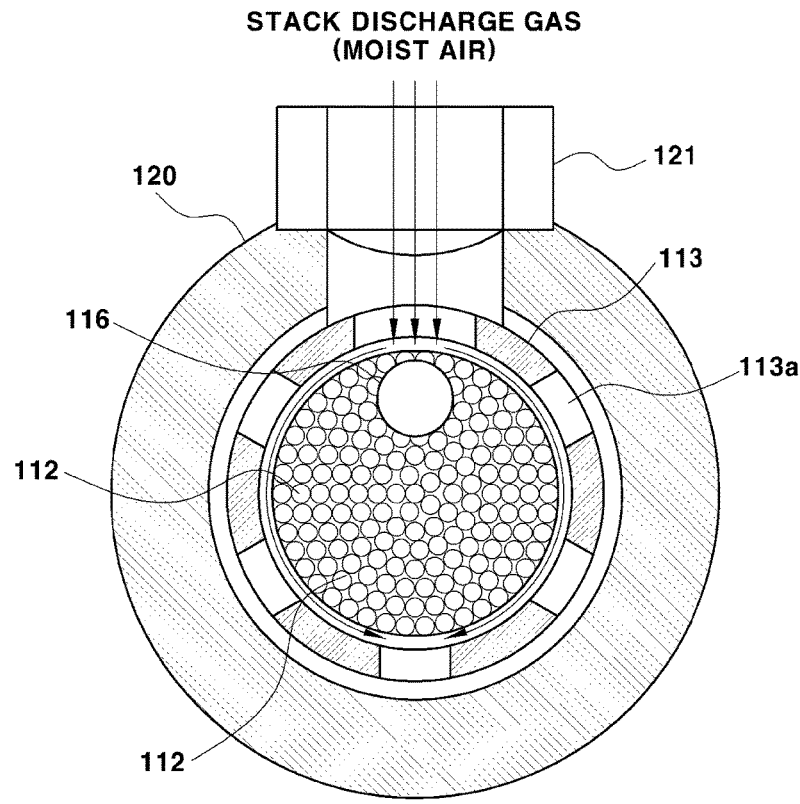
FIG. 12 is an exemplary diagram schematically illustrating a membrane humidifier in which an aperture size of a manifold is improved, as the exemplary embodiment of the present invention.

In the accompanying drawings, FIG. 11 is an exemplary diagram schematically illustrating an example in which positions and the number of tube side air supply tubes are changed and FIG. 12 is an exemplary diagram schematically illustrating an example in which a size of a manifold formed in the case for the membrane module is changed and adjusted.

In the general membrane humidifier, an entrance and exhaust direction (e.g., inlet and outlet direction) of the tube side air and the moist air may be defined and the flows of the tube side air and the moist air may counter flow to each other and therefore it may be difficult to maintain the uniformity of the flows. Further, a packing ratio of the hollow fiber may be substantial and therefore the performance of the plurality of tube side air supply tubes may be improved. Accordingly, the humidification performance may be improved by changing and adjusting the positions and number of tube side air supply tubes 116.

Referring to FIG. 11, for example, the tube side air supply tube 116 may be disposed at the substantial centers of the bundle of hollow fibers 112 and the membrane module 110 or eccentrically disposed to one side thereof and may be configured in plural to be disposed to be spaced apart from each other inside the bundle of hollow fibers 112 and the membrane module 110. In particular, when the tube side air supply tube 116 may be eccentrically disposed and thus may be closely disposed to (e.g., adjacent to) the moist air inlet 121, a momentum of the moist air may be maintained and a pressure loss inside the humidifier may be minimized.

When the tube side air supply tube 116 is eccentrically disposed based on the radial direction and thus adjacent to the moist air inlet 121, the pumping function of the moist air may be improved by adjusting the size of the aperture 113a of the manifold 113 configured in the membrane module 110. For example, as illustrated in FIG. 12, the aperture of the manifold 113 closest to the moist air inlet 121 and the moist air pumping parts 140, 140-1, and 140-2 among the apertures 113a of the manifold 113 coupled with the case 111 of the membrane module 110 may be formed to be greater than the other apertures, thereby helping pump the moist air.

As illustrated in FIG. 10, the membrane module 110 may include manifolds 113 and 114 each coupled with both ends of the case 111 to enclose both ends of the bundle of hollow fibers 112 and the manifolds 113 and 114 may include a plurality of apertures in a circumferential direction to improve the distribution of the moist air introduced into the membrane module 110. Therefore, the moist air introduced through the moist air inlet 121 may be introduced into the membrane module 110 through the apertures 113a of the manifold 113 of one side and the moist air moving through the bundle of hollow fibers 112 inside the membrane module 110 may be discharged to the exterior of the membrane module 110 through the apertures of the manifold 114 of the other side and then may be discharged to the moist air outlet 131.

Figure 13:
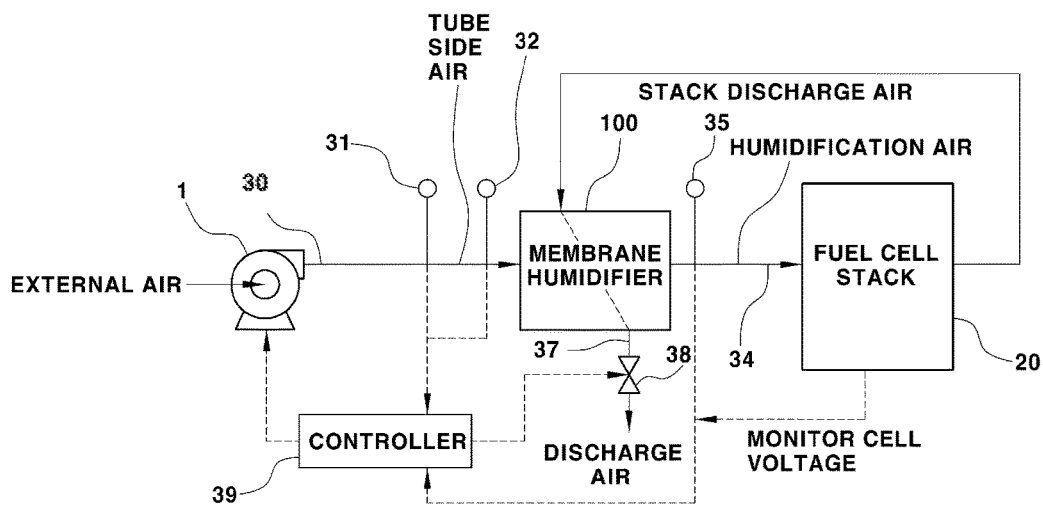
FIG. 13 is an exemplary diagram schematically illustrating a stack air control system using the membrane humidifier according to the exemplary embodiment of the present invention.

In the accompanying drawings, FIG. 13 is an exemplary diagram schematically illustrating a stack air control system using the membrane humidifier according to the exemplary embodiment of the present invention. Generally, the fuel cell stack may be operated based on conditions of air supply pressure and flow rate, air SR, and air humidity. The conditions are items which may be controlled during the supply air to the stack, and in particular, may be sensitively controlled by an exhaust control valve configured to adjust air discharge.

For example, the membrane humidifier may be efficiently operated under the conditions in which the pressure of air supplied to the stack is increased and the flow rate is minimal. Similar to the membrane humidifier 100 according to the exemplary embodiment of the present invention, the humidifier including the ejector structure may be more sensitively operated under the conditions since the operation of the ejector inside the humidifier is similar to a pressure difference between the inlet and outlet of the stack. In other words, when the pressure difference of the stack is substantial, the required pumping pressure of the ejector may be further increased or the flow rate of pumping may be reduced, and the recycling amount of air by the ejector may be reduced. To optimize the operation of the stack, measurement of the humidity of air supplied to the stack, the flow rate of air supplied to the fuel cell stack, a pressure of an outlet of the air blower, the pressure difference between the inlet and outlet of the stack, cell voltage, and the like is required and if necessary, a previously configured map may be used.

Referring to FIG. 13, an exemplary stack air control system may include a pressure sensor 31 and a flow rate sensor 32 mounted in a tube side air supply line 30 between the air blower 1 and the membrane humidifier 100, a humidity sensor 35 mounted in a gas air supply line 34 between the membrane humidifier 100 and the fuel cell stack 20, an exhaust control valve 38 mounted in a moist air discharge line 37 of the membrane humidifier 100, and a controller 39 configured to use information received from each of the sensors 31, 32, and 35 and a value obtained by monitoring the cell voltage of the fuel cell stack 20 to operate the air blower 1 and the exhaust control valve 38.

Figure 14:
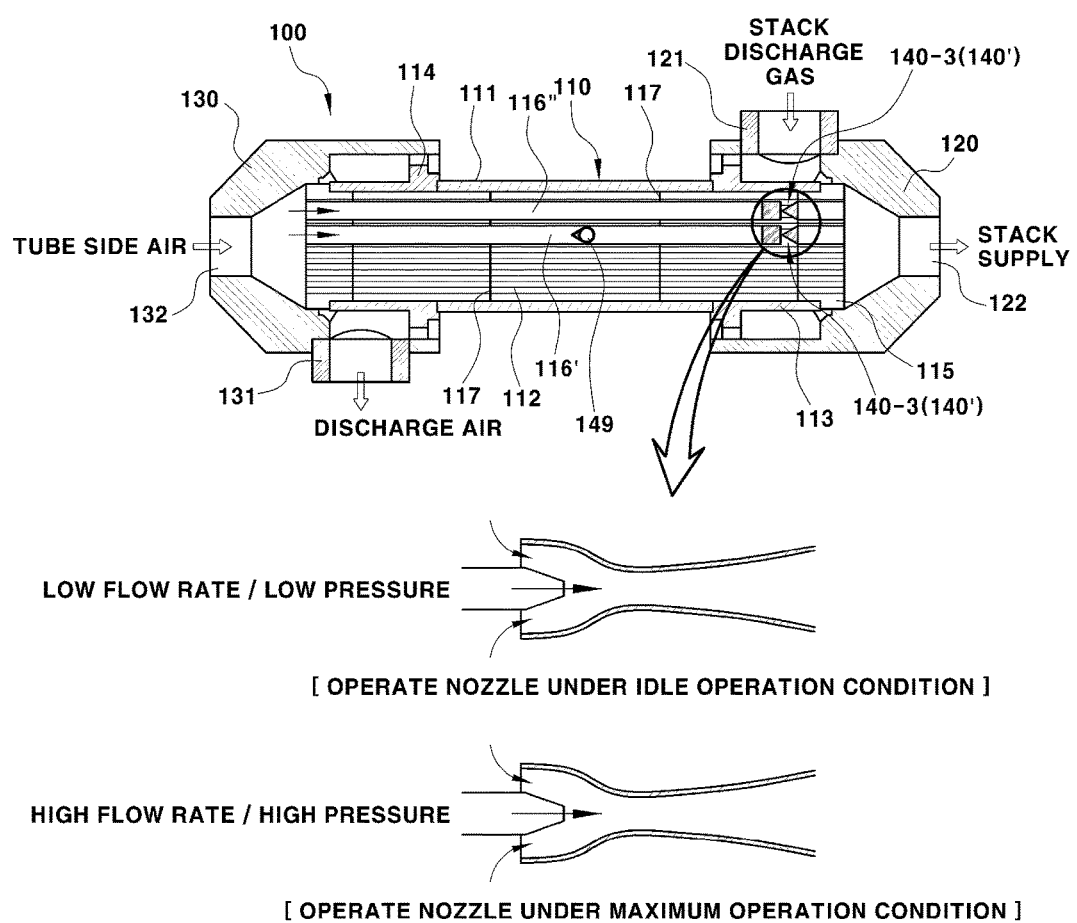
FIG. 14 is an exemplary diagram schematically illustrating the membrane humidifier in which a check valve is mounted in the tube side air supply tube, as the exemplary embodiment of the present invention.

In the accompanying drawings, FIG. 14 is an exemplary diagram schematically illustrating the membrane humidifier in which a check valve may be mounted in the tube side air supply tube. As illustrated in FIG. 14, when the plurality of tube side air supply tubes 116 are mounted inside the membrane module 110, a moist air pumping part 140-3 may be mounted in each of the tube side air supply tubes 116. In particular, a check valve 149 may be mounted in any one of the tube side air supply tubes, to further improving the pumping performance of the moist air pumping part 140-3.

The general fuel cell stack may be operated by an operation pressure of a normal pressure (e.g., a predetermined pressure) and therefore the moist air discharged from the stack may maintain a high pressure and the recycling and pumping of the moist air by the moist air pumping parts 140, 140-1, 140-2, and 140-3 may be performed under the high pressure difference condition of the cathode of the stack. Therefore, as described above, when the check valve 149 is mounted in the tube side air supply tube 116, the check valve may be mounted in the tube side air supply tube 116 in which a first moist air pumping part (e.g., high-performance moist air pumping part) 140' having substantially high pumping performance (e.g., the size of the nozzle part is substantial when the ejector structure is used) is mounted, such that an automatic air supply control of the first moist air pumping part 140' and a second moist air pumping part (e.g., low-performance moist air pumping part) 140" may be performed.

For example, the first moist air pumping part 140' may be configured to pump the recycling moist air under a high load (e.g., high output) operation condition and the second moist air pumping part 140" may be configured to pump the recycling moist air under a low load (e.g., low output) operation condition. In particular, the check valve 149 may be mounted in the first tube side air supply tube 116' in which the first moist air pumping part 140' is mounted, to allow the automatic pumping control of the first and second moist air pumping parts 140' and 140" to be performed based on an opening and closing state of the check valve 149. The second moist air pumping part 140" may be mounted in a second tube side air supply tube 116".

Particularly, when a difference pressure of the shell side (e.g., shell side of the bundle of hollow fibers) of the membrane module 110 is less than a cracking pressure of the check valve 149, the moist air may be pumped and supplied by the second moist air pumping part 140" and when a pressure difference of the shell side of the membrane module 110 is greater than the cracking pressure of the check valve 149, the moist air may be pumped and supplied by the first and second moist air pumping parts 140' and 140".

When the check valve 149 is closed to cut off the flow of the tube side air, the first moist air pumping part 140' may be configured to stop the pumping operation of the moist air. The pressure difference may be a pressure difference between the pressure of the moist air discharged from the cathode of the stack and the pressure of the moist air introduced into the membrane module 110. The cracking pressure of the check valve 149 may be appropriately defined based on the design conditions.

Although the exemplary embodiments of the present invention are described above in detail, the protection scope of the present invention is not limited to the foregoing exemplary embodiments. Therefore, various changes and improved forms by those skilled in the art using basic concepts of the present invention defined in the following claims belong to the protection scope of the present invention.

What is claimed is:

1. A humidifier for a fuel cell system, comprising:
   a membrane module in which hollow fibers are fixed inside a case in a bundle form; and
   a first manifold and a second manifold each assembled at both ends of the case,
   wherein an inside of the membrane module includes a tube side air supply tube that forms a gas flow in the same direction as the hollow fiber and one side of the tube side air supply tube includes at least one moist air pumping part configured to suction moist air flowing to an exterior of the tube side air supply tube by a flow velocity and a flow pressure of tube side air, to increase humidification performance of humidification air discharged to a fuel cell stack.

2. The humidifier for a fuel cell system of claim 1, wherein as the moist air pumping part suctions the moist air flowing in the exterior of the tube side air supply tube, the moist air pumping part leads to a flow of the moist air in a radial direction within the membrane module and leads to a mixing of the tube side air flowing in the tube side air supply tube with the suctioned moist air.

3. The humidifier for a fuel cell system of claim 1, wherein the moist air pumping part is a single ejector structure or is a multi-stage ejector structure configured by serially connecting a plurality of ejectors in a multi stage.

4. The humidifier for a fuel cell system of claim 1, wherein the moist air pumping part is a venturi tube structure.

5. The humidifier for a fuel cell system of claim 1, wherein the moist air pumping part is a venturi tube structure and includes a minimal diameter part disposed at a substantial center thereof and maximum diameter parts integrally formed at left and right sides of the minimal diameter part and form the gas flow in the same direction as the tube side air supply tube and a surface of the minimal diameter part includes a plurality of introduction apertures through which the moist air is introduced.

6. The humidifier for a fuel cell system of claim 1, wherein the moist air pumping part is mounted at a back end of the tube side air supply tube to be disposed adjacent to a moist air inlet mounted in the first manifold.

7. The humidifier for a fuel cell system of claim 1, wherein the tube side air supply tube is disposed at a substantial center based on a diameter of the membrane module or eccentrically disposed to one side based on a diameter of the membrane module or is configured in plural and is disposed to be spaced apart from each other inside the membrane module.

8. The humidifier for a fuel cell system of claim 1, wherein the tube side air supply tube is eccentrically disposed to one side based on a diameter of the membrane module and is disposed adjacent to a moist air inlet.

9. The humidifier for a fuel cell system of claim 1, wherein the membrane module includes a tube support attached to an inner diameter of the case to support the tube side air supply tube.

10. The humidifier for a fuel cell system of claim 1, wherein in the membrane module, a first manifold is coupled with one end of the case via a manifold and sizes of a plurality of apertures formed along a circumferential direction of the manifold are differently formed based on a positional relationship between the moist air pumping part and a moist air inlet mounted in the first manifold.

11. The humidifier for a fuel cell system of claim 1, wherein in the membrane module, a first manifold is coupled with one end of the case via a manifold and an aperture closest to the moist air pumping part and the moist air inlet mounted in the first manifold among a plurality of apertures formed along a circumferential direction of the manifold is formed to be greater than the other apertures.

12. The humidifier for a fuel cell system of claim 1, wherein the inside of the membrane module includes a first tube side air supply tube including a first moist air pumping part and a second tube side air supply pipe including a second moist air pumping part and a check valve is mounted in the first tube side air supply pipe in which the first moist air pumping part having improved performance among the first and second moist air pumping parts mounted to automatically control an operation of the first moist air pumping part.

13. A vehicle having the fuel cell system comprising the humidifier of claim 1.

* * * * *